United States Patent
Bozanic et al.

[15] 3,671,855
[45] June 20, 1972

[54] BROADBAND ZERO FIELD EXCHANGE ECHO SYSTEM

[72] Inventors: Donald A. Bozanic; Dickron Mergerian, both of Baltimore; Ronald W. Minarik, Lutherville, all of Md.

[73] Assignee: Westinghouse Electric Corporation, Pittsburgh, Pa.

[22] Filed: July 28, 1969

[21] Appl. No.: 845,406

[52] U.S. Cl. ........................324/0.5, 340/173 NI, 333/24.1
[51] Int. Cl. ..........................................................G01n 27/78
[58] Field of Search............................324/0.5; 333/24, 24.1; 340/173 NI

[56] References Cited

UNITED STATES PATENTS

3,324,461   6/1967   Kaplan...................................340/173

OTHER PUBLICATIONS

J. P. Gordon & K. D. Bowers, Microwave Spin Echoes from Donor Electrons In Silicon, Physical Review Letters, 1(10), Nov. 15, 1958, pp. 368–370.

*Primary Examiner*—Michael J. Lynch
*Attorney*—F. H. Henson and E. P. Klipfel

[57] ABSTRACT

A system for the generation of an "exchange echo" signal similar to a spin echo signal utilizing a very heavily doped sample such as rutile, having paramagnetic defect centers in the order of $1 \times 10^{19}$ to $1 \times 10^{21}$ defect centers/cm, wherein no magnetic field of any kind is necessary for the production of the echo signals, and wherein echo bandwidths considerably greater than those generally associated with spin echoes (less than 300 MHz) are achievable.

12 Claims, 2 Drawing Figures

3,671,855

BROADBAND ZERO FIELD EXCHANGE ECHO SYSTEM

BACKGROUND OF THE INVENTION

1. Field of the Invention

The subject invention is directed to apparatus for the generation of newly discovered echo signals termed "exchange echo" which is related to the spin echo phenomenon. In spin echo systems successive RF pulses separated by a predetermined time interval are fed into a resonant cavity having a paramagnetic spin echo sample located therein and situated between a static unidirectional magnetic field to establish a state of thermal equilibrium. When a first RF field or pulse having a frequency equal to the characteristic or Larmor frequency of the sample is applied at right angles to the magnetic field, a torque is applied to the moment which causes it to be tipped away from the direction of the field. The angle of tipping, that is the angle between the moment and the direction of the field is proportional to the magnitude of the field and the time during which the RF field exists. Upon release of the displacing force, the spinning electrons urged again toward realignment by the force of the field rotate or precess about the field in much the same manner as a tipped gyroscope. When the sample is then subjected to another RF field or pulse also directed normal or transverse to the magnetic field, a sample spontaneously develops a magnetic field of its own which is also normal to the magnetic field and which rotates about the latter's direction. The strength of the rotating field builds up to a maximum and then decays which is then picked up and detected as an electrical pulse called a spin echo signal.

2. Description of the Prior Art

Pulsed nuclear induction spin echo systems are well known to those skilled in the art. An example of such a teaching is found in U. S. Pat. No. 2,887,673 issued to E. L. Hahn. Further development in the art resulted in electron spin echo systems, an example of which is disclosed in U. S. Pat. No. 3,129,410 issued to P. P. Sorokin. The difference between electron and nuclear spin systems is the difference in the operating frequency encountered. This is attributed to the smaller mass of the electron in comparison to the proton in the nucleus. The precessional or Larmor frequencies of electrons therefore lie in the microwave range. Still a later development has been a recent discovery of a zero field spin echo signal reported on Mar. 31, 1968 by D. E. Kaplan in a final report by Lockheed Research Laboratory on Contract No. 2541(00). This disclosure indicated that an electron spin echo signal was observed at zero magnetic field under the following conditions: The spin echo material was $CaF_2$ doped with 0.1 percent − 0.5 percent of $Ce^{3-}$. Line widths observed were approximately 20 MHz and phase memory times of 1 microsecond.

SUMMARY

Briefly, the inventive concept is directed to the discovery of a phenomenon which is similar to the spin echo phenomenon and comprises the use of a very heavily doped echo host material having a concentration of paramagnetic defect centers in the order of $1 \times 10^{20}$ defect centers/cm³ in a material such as rutile doped with iron located in a microwave transmission line. The system is operated at cryogenic temperatures in the region of 4° K whereupon the application of a pair of microwave pulses separated by a predetermined time interval in absence of any external magnetic field will cause an "exchange echo" to be produced by the sample after the time equal to the time interval between the two applied pulses. The present invention also contemplates a system including means for receiving an externally generated microwave pulse which is coupled to the above mentioned heavily doped material as well as means for internally generating a second or recall microwave pulse after a predetermined time delay which is also applied to the sample for generating an "exchange echo" and suitably amplifying and transmitting the exchange echo back to the source of the first microwave pulse.

DESCRIPTION OF THE PREFERRED EMBODIMENTS

Figure 1:
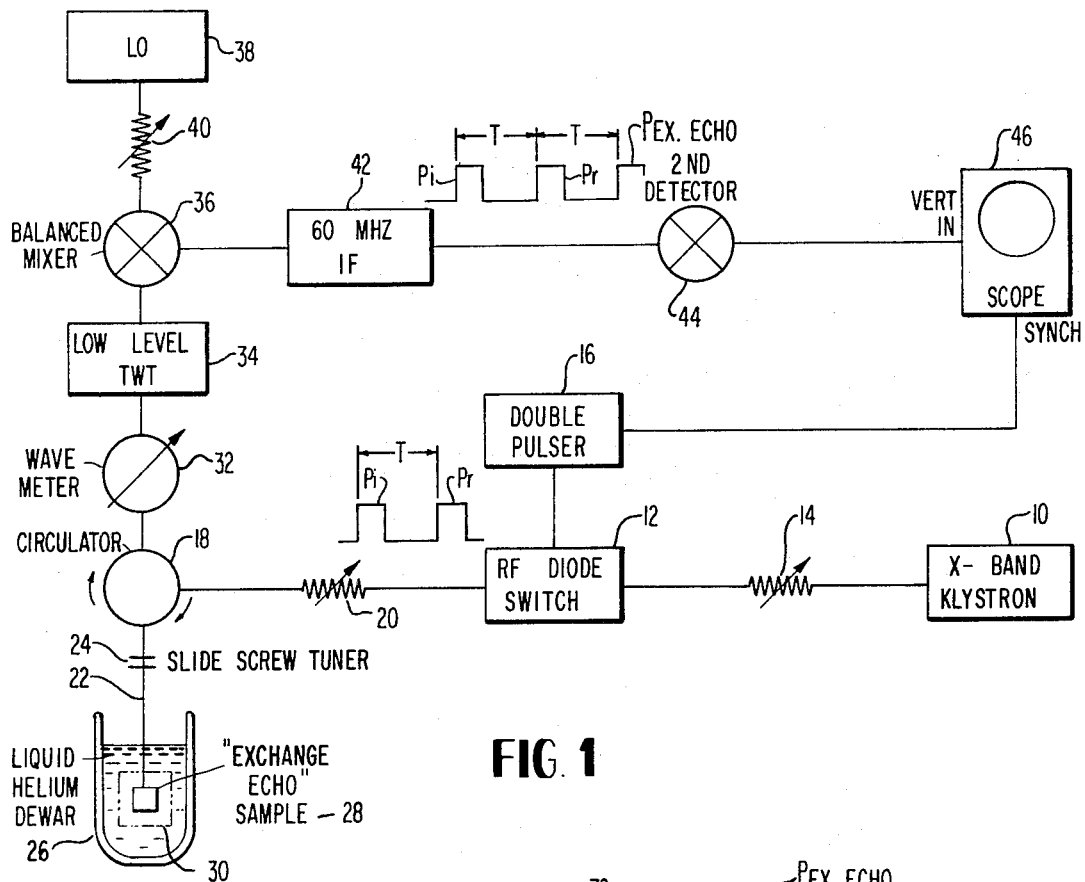
FIG. 1 is a block diagram of a first embodiment of apparatus for practicing the subject invention.

Referring now to the drawings wherein like numerals refer to like parts, attention is directed to FIG. 1 which discloses one embodiment of the subject invention. Reference numeral 10 refers to a microwave source comprising an X-band CW klystron operable in the range of, for example, 9–10 GHz. The microwave source 10 is coupled to a controlled RF diode switch 12 by means of a microwave signal path including the level-set attenuator 14. The RF diode switch 12 is controlled by a double pulser circuit 16 which is operable to produce a pair of gates separated by a predetermined time interval T for producing an output of the diode switch 12 a pair of microwave pulses corresponding to the initial pulse $P_i$ and the recall pulse $P_r$ of a spin echo system. The pulses $P_i$ and $P_r$ are coupled to a circulator 18 by means of a waveguide path including a second level set attenuator 20 whereupon the microwave pulses $P_i$ and $P_r$ are transferred to a waveguide transmission line 22 including a slide screw tuner 24. The waveguide transmission line 22 is terminated in a cryostat 26 comprising a dewar flask which contains a cryogenic material such as liquid helium for operation at extremely low temperatures e.g. 4° K. The waveguide 22 immersed in a liquid helium of the cryostat 26 contains a high dielectric material which comprises a heavily doped echo sample 28. The sample material is preferably rutile heavily doped with iron producing paramagnetic defect centers having a concentration in the order of $1 \times 10^{19}$ to $1 \times 10^{21}$ defect centers per cm³. When desirable, other highly doped high dielectric materials such as iron doped strontium titanate and barium titanate may be utilized as well as chromium doped rutile. When such materials are utilized, no cavity is required due to the dielectric cavity resonances set up within the material itself. These cavity modes will allow very strong coupling between the microwave signal and the defect centers. When a low dielectric material such as zinc tungstate having a doping concentration to the degree noted above it is utilized, an auxiliary microwave cavity 30 is coupled to the waveguide 22 and the echo sample 28 is placed therein. This is required because of the relatively poor coupling between the microwave energy and the defect centers for a low dielectric host material. Therefore when a heavily doped high dielectric material is utilized no cavity is required, but when a low dielectric material is utilized, the auxiliary cavity 30 becomes necessary.

When the pulses $P_i$ and $P_r$ are coupled to the heavily doped sample 28 which is at a temperature in the range of 4° K in absence of any magnetic field, an echo signal is produced which is coupled back along the waveguide 22 through the circulator 18 and to an output branch waveguide including a wave meter 32 and a low level amplifier comprising a traveling wave tube 34. The "exchange echo" signal which is amplified and applied to the balanced mixer 36 which receives a local oscillator signal from the oscillator 38 by means of the waveguide path includes a variable attenuator 40. The output of the mixer 36 comprises an IF signal of the two microwave pulses $P_i$ and $P_r$ used to generate the "exchange echo" signal in addition to the echo signal $P_{ex\ echo}$ itself. This IF signal is coupled to an IF amplifier 42 where it is then fed to a second detector 44 which produces a video signal output of the pulses in question which can be viewed on an indicator 46 which may be, for example, an oscilloscope. A lead from the double pulser 16 is coupled to the indicator 46 for providing a "sync" signal for viewing any or all of the signals.

For a particular defect center in a particular host, it may be possible to have a zero field splitting of the electron spins if the zero field splitting corresponds exactly to the signal at which the system is operating. However, such a system is inherently narrow banded (of the order of 0.1 percent BW) because of the characteristic linewidth of the paramagnetic defect centers. In the present invention the effect is due to a series of lines which appear due to the iron group transition ions which are influenced by other iron ions located near each other and coupled through exchange interaction. In other words, there occurs a large number of lines which are not ordinarily observable with lesser doped materials. As a result of this concentration, these newly discovered echo signals have been designated "exchange echoes." Magnetic resonance absorption lines resulting from such exchange interactions are not completely understood, however, in general it is known that when such effects are prevalent, they can give rise to a very large number of lines which may be located so close together that they may be superimposed upon each other so that a broad absorption line results therefrom. That is, use is being made of the lines which are apparent due to the doping and since the doping concentration is very large, a broad composite absorption line results.

In a sample comprised of iron doped rutile located in a section of X-band waveguide at 4° K, an "exchange echo" signal was produced in the absence of any magnetic field including the earth's magnetic field at all frequencies between 9 and 10 GHz with no apparent variation in amplitude as a function of frequency. Since exchange effects produce a large number of lines, it is quite possible that the effect may be observable over all of X-band as well as other frequencies. Due to the broad band capability of the zero field "exchange echo" signal produced in accordance with the subject invention, a second embodiment logically develops therefrom which may be in the form of a microwave pulse repeater.

Figure 2:
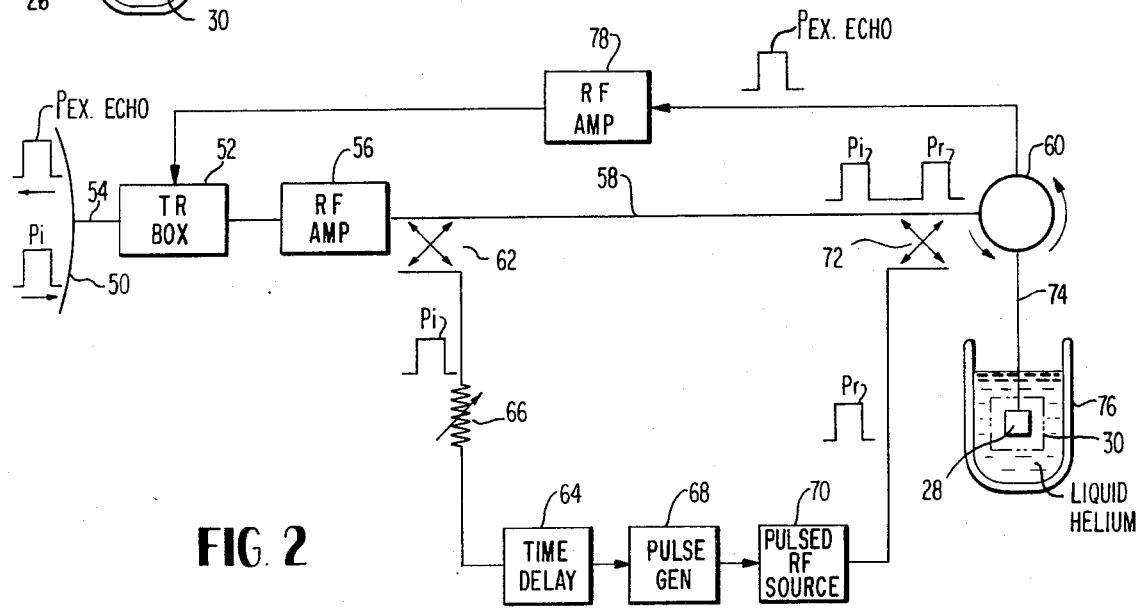
FIG. 2 is a block diagram of a second embodiment of apparatus for practicing the subject invention.

Directing attention now to FIG. 2, there is disclosed antenna means 50 in the form of a microwave "dish" antenna adapted to receive an input pulse $P_i$ from an external source not shown. The input microwave energy is coupled to a transmit-receive device 52 commonly referred to as a "TR Box" by means of a waveguide means 54. The output of the TR device 52 is coupled into an RF amplifier 56, the output of which is coupled by means of a waveguide circuit 58 to a circulator 60. A waveguide coupler 62 couples a portion of the signal $P_i$ from the waveguide circuit 58 to a time delay circuit 64 by means of waveguide circuit including a variable attenuator 66. The delayed output of the delay circuit 64 is coupled to a pulse generator 68 which drives a pulsed RF source 70 to produce a second or recall pulse $P_r$. The recall pulse $P_r$ is then coupled back to the waveguide circuit 58 by means of a second microwave coupler 72. The input to the circulator 60 then comprises a pair of microwave pulses which are then coupled into a waveguide transmission line 74 which is terminated and immersed in a cryostat 76 containing a cryogenic material such as liquid helium. The waveguide 74 immersed in liquid helium contains an "exchange echo" sample 28 as noted above. The sample which is preferably very heavily doped with iron produces an "exchange echo" signal in absence of a magnetic field which is coupled back into the waveguide 74 and into the circulator 60. The circulator 60 translates the echo signal to an RF amplifier 78 which is then coupled back to the TR device 52. The TR device 52 then feeds the "exchange echo" signal back to the antenna 50 which reradiates the echo signal back to the source of the received pulse $P_i$.

Since the zero field exchange echo is very broadband, it is possible for the same sample 26 to receive and subsequently transmit many pulses at different frequencies within the overall bandwidth. Thus it is possible to pick up a plurality of different external microwave generators using entirely different frequencies, and the system will respond to each of these frequencies and retransmit them at their respective frequencies.

The "exchange echo" signals behave substantially like the common spin echo signal which has been studied at great length. It is possible to vary the delay time between the initial pulse and the echo signal by changing the time between the initial pulse and the recall pulse. Furthermore, it is possible not only to generate the two pulse echoes which have been described above which are phase coherent with the initial input pulse, but it is also possible to generate three pulse echo signals or "stimulated" echoes which are not phase coherent but do maintain pulse shape and internal coherence with the initial pulse. The latter form of echo signal has the advantage that it can be observed for delays greater than the spin lattice relaxation time of the sample which may be in the order of milliseconds or even seconds depending upon the material utilized. In iron doped rutile, for example, a stimulated "exchange echo" can be generated having a delay of approximately one millisecond.

While there has been shown and described what is at present considered to be the preferred embodiment of the invention, modification thereto will readily occur to those skilled in the art. For example, the embodiments shown in FIG. 2 can be designed such that an initial 90° prepulse is applied to the system prior to the reception of the input pulse $P_i$. Upon the application of a second internally generated 90° recall pulse, a stimulated "exchange echo" will be observed after a time equal to the intervals between the prepulse and the received pulse and the received pulse and the recall pulse. This echo will have the shape of the received pulse and will not be inverted as is the case of the common two pulse echo system. By suitably amplifying and transmitting the stimulated "exchange echo" back to the source of the pulse $P_i$, it is possible to provide false information concerning the presence of the embodiment comprising the subject invention.

It is not desired, therefore, that the invention be limited to the specific arrangements shown and described, but it is to be understood that all equivalents, modifications and alterations coming within the spirit and scope of the present invention are herein meant to be included.

We claim as our invention:

1. An "exchange echo" system comprising in combination:
    means providing a first and a second RF microwave pulse separated by a predetermined time interval;
    waveguide transmission line means coupled to said means providing said first and said second RF microwave pulse;
    an "exchange echo" sample comprising a heavily doped host material having paramagnetic defect centers consisting of iron group transition metal ions in the order of $1 \times 10^{20}$ defect centers/cm$^3$ located in said waveguide transmission line means, being responsive to said first and second RF microwave pulses; and
    a means surrounding said "exchange echo" sample for reducing the temperature of said sample to a predetermined cryogenic temperature, said "exchange echo" sample generating an "exchange echo" signal upon the reception of said first and second RF microwave pulses.

2. The invention as defined in by claim 1 wherein said waveguide transmission line means additionally includes a microwave cavity enclosing said sample.

3. The invention as defined by claim 2 wherein said iron group transition metal ions have a concentration in the range of $1 \times 10^{19}$ to $1 \times 10^{21}$ defect centers/cm$^3$.

4. The invention as defined by claim 3 wherein said sample is comprised of iron doped zinc tungstate.

5. The invention as defined by claim 1 wherein the sample is doped with iron group transition metal ions.

6. The invention as defined by claim 5 wherein said cryogenic temperature is in the region of 4° K.

7. The invention as defined by claim 6 wherein said material is comprised of iron doped rutile.

8. The invention as defined by claim 7 wherein said material is comprised of chromium doped rutile.

9. The invention as defined by claim 6 wherein said material is comprised of iron doped strontium titanate.

10. The invention as defined by claim 6 wherein said material is comprised of iron doped barium titanate.

11. The invention as defined by claim 1 wherein the means surrounding said "exchange echo" sample material comprises a cryostat.

12. The invention as defined by claim 11 wherein said cryostat additionally includes liquid helium.

* * * * *